(12) United States Patent
Lee

(10) Patent No.: US 9,730,283 B2
(45) Date of Patent: *Aug. 8, 2017

(54) DRIVERS AND DRIVING METHODS FOR A LED STRING, CAPABLE OF PROVIDING LED SHORT PROTECTION OR AVOIDING LED FLICKERING

(71) Applicant: Leadtrend Technology Corporation, Hsinchu (TW)

(72) Inventor: Ching-Tsan Lee, Miaoli County (TW)

(73) Assignee: LEADTREND TECHNOLOGY CORPORATION, Hsinchu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 15/018,755

(22) Filed: Feb. 8, 2016

(65) Prior Publication Data
US 2016/0157312 A1 Jun. 2, 2016

Related U.S. Application Data

(63) Continuation of application No. 13/834,024, filed on Mar. 15, 2013, now Pat. No. 9,301,364.

(30) Foreign Application Priority Data

Oct. 5, 2012 (TW) .............................. 101136768 A

(51) Int. Cl.
*H05B 37/00* (2006.01)
*H05B 33/08* (2006.01)

(52) U.S. Cl.
CPC ....... *H05B 33/0815* (2013.01); *H05B 33/083* (2013.01); *H05B 33/0887* (2013.01); *Y02B 20/341* (2013.01)

(58) Field of Classification Search
None
See application file for complete search history.

(56) References Cited

U.S. PATENT DOCUMENTS

| | | | |
|---|---|---|---|
| 9,301,364 B2* | 3/2016 | Lee | H05B 33/0887 |
| 2006/0279228 A1* | 12/2006 | Kato | H05B 33/0818 |
| | | | 315/193 |
| 2011/0181582 A1 | 7/2011 | Murakami | |
| 2013/0313974 A1* | 11/2013 | Fan | H05B 33/0815 |
| | | | 315/127 |

* cited by examiner

*Primary Examiner* — Long Nguyen
(74) *Attorney, Agent, or Firm* — McClure, Qualey & Rodack, LLP

(57) ABSTRACT

The disclosure regards to drivers and driving methods for a LED string consisting of LEDs. The LED string and a current switch are coupled in series between a power line and a ground line. The power line is powered to regulate a signal representing a current passing through the LED string. An enable signal capable of switching the current switch is provided. Whether a predetermined event occurs is detected. When the predetermined event occurs, the enable signal is clamped to have a predetermined logic value, the current switch thereby being kept either open or short.

15 Claims, 6 Drawing Sheets

DRIVERS AND DRIVING METHODS FOR A LED STRING, CAPABLE OF PROVIDING LED SHORT PROTECTION OR AVOIDING LED FLICKERING

CROSS-REFERENCE TO RELATED APPLICATION

This is a continuation application of U.S. application Ser. No. 13/834,024 entitled "Drivers and Driving Methods for a LED String, Capable of Providing LED Short Protection or Avoiding LED Flickering," filed on Mar. 15, 2013, which claims priority to and the benefit of Taiwan Application Serial Number 101136768, filed on OCT. 5, 2012, both of which are incorporated by reference in their entirety.

BACKGROUND

The present disclosure relates generally to drivers and driving methods for light emitting diodes (LEDs).

Superior in power conversion efficiency, compact product size, and life span, LEDs are broadly popular in the industries of house lighting and panel backlight. For example, a great number of LCD backlight panels are currently using LED modules for backlight, rather than CCFL modules that were commonly adopted several years ago.

FIG. 1 demonstrates a LED driver 10 capable of being used in a backlight module. The LED driver 10 drives a LED string 12 consisting of LEDs connected in series. In the LED driver 10, a booster 18 converts power source $V_{IN}$ at a major power line to power source $V_{OUT}$ at an output power line OUT. A LED string 12 and a current switch 22 are connected in series between the output power line OUT and a ground line GND. A power controller 14 periodically turns ON and OFF a power switch 16 to control the power conversion of the booster 18. While powering the output power line OUT, the major purpose of the power controller 14 is to stabilize a feedback voltage $V_{FB}$ at the feedback node FB, equivalently stabilizing the current flowing through the LED string 12 and the brightness of the LED string 12.

A dimming signal $S_{DIM}$ is fed to the enable node EN of the power controller 14. A level shifter 20 shifts the dimming signal $S_{DIM}$ with a logic level of 5V to become a switch signal $S_{MOSDIM}$ with a logic level of 12V. When the dimming signal $S_{DIM}$ is 5V in voltage level, or "1" in logic, the current switch 22 is ON, performing a short circuit, and the power controller 14 periodically switches the power switch 16 to regulate the feedback voltage $V_{FB}$. Accordingly, the LED string 12 illuminates stably.

When the dimming signal $S_{DIM}$ is 0V in voltage level, or "0" in logic, the current switch is OFF, performing an open circuit, and the power controller 14 constantly turns OFF the power switch 16. As there is no power converted to power the LED string 12, it darkens.

The design of the LED driver 10 shall take several abnormal events, such as LED open, LED short, output over voltage, or flickering, to name a few, into consideration. For example, if power source $V_{OUT}$ at an output power line OUT is over high, it might impose electric shock to careless operators or fire accident to environment, such that output over voltage should be prevented.

SUMMARY

Embodiments of the present invention disclose a driver for driving a LED string consisting of LEDs. The driver has a current switch and a switched mode power supply. The current switch is connected in series with the LED string between a power line and a ground line. The switched mode power supply powers the power line to regulate a signal representing a current passing through the LED string. The switched mode power supply comprises an enable node and a clamping circuit. An enable signal at the enable node is capable of switching the current switch. When a predetermined event occurs the clamping circuit clamps the enable signal to have a predetermined logic value, the current switch thereby being kept either open or short.

Embodiments of the present invention disclose a driving method for a LED string consisting of LEDs. The LED string and a current switch are coupled in series between a power line and a ground line. The power line is powered to regulate a signal representing a current passing through the LED string. An enable signal capable of switching the current switch is provided. Whether a predetermined event occurs is detected. When the predetermined event occurs, the enable signal is clamped to have a predetermined logic value, the current switch thereby being kept either open or short.

BRIEF DESCRIPTION OF THE DRAWINGS

The invention can be more fully understood by the subsequent detailed description and examples with references made to the accompanying drawings, wherein.

DETAILED DESCRIPTION

Figure 1:
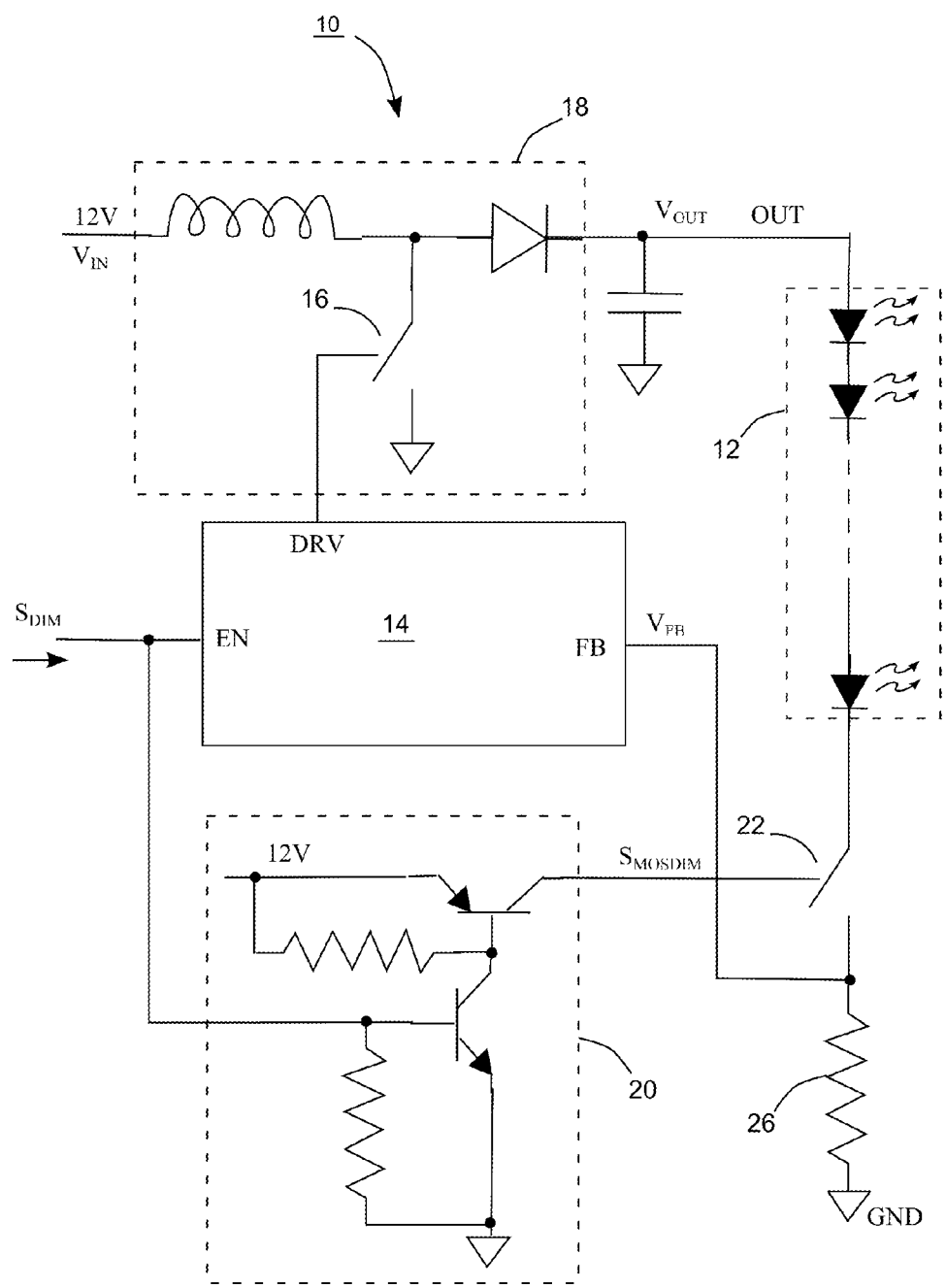
FIG. 1 demonstrates a LED driver in the prior art.
Figure 2:
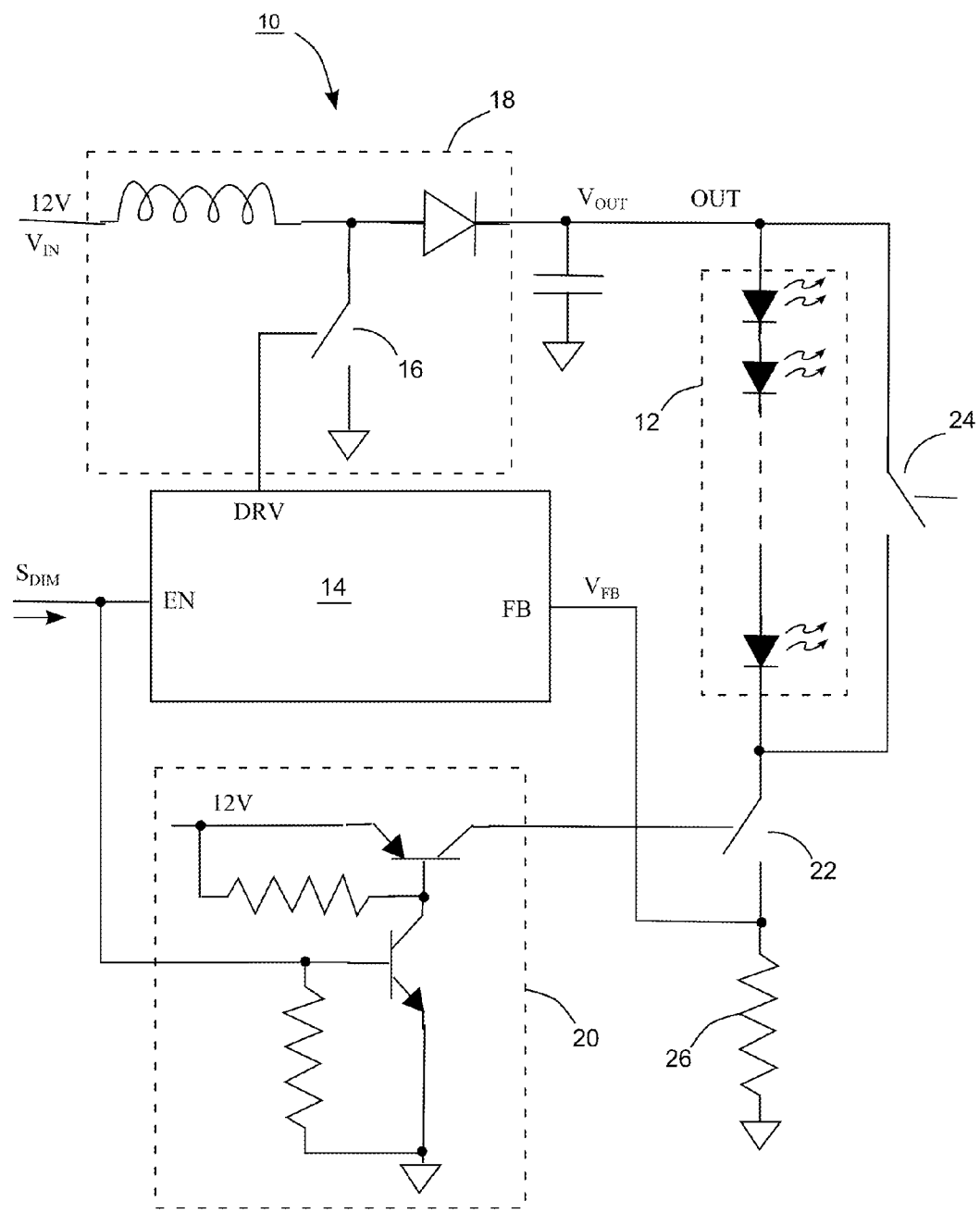
FIG. 2 shows a system circuit to mimic the event when the LED driver of FIG. 1 encounters an LED short event.

FIG. 2 shows a system circuit to mimic the event when the LED driver 10 of FIG. 1 encounters an LED short event. In comparison with the LED driver 10 of FIG. 1, additionally in FIG. 2 is a switch 24, connected in parallel to the LED string 12. As mentioned in the section of "background", when the dimming signal $S_{DIM}$ is "1" in logic, the current switch 22 is ON and the power controller 14 periodically switches the power switch 16. In the meantime, if switch 24 suddenly switches to perform a short circuit, which imitates the happening of an LED short event when all the LEDs in the LED string 12 are all shorted, the feedback voltage $V_{FB}$ rises quickly as being pulled by the power source $V_{OUT}$, which could be as high as 100V. In case there is no strategy designed to encounter the LED short event, the power controller 14 suffers the over high feedback voltage $V_{FB}$, and risks itself in overvoltage damages or fire accidents caused. Analogously, as feedback voltage $V_{FB}$ rises, a large amount of current will pass through the current switch 22 and resister 26, probably causing overheat damage or getting fire.

Figure 3:
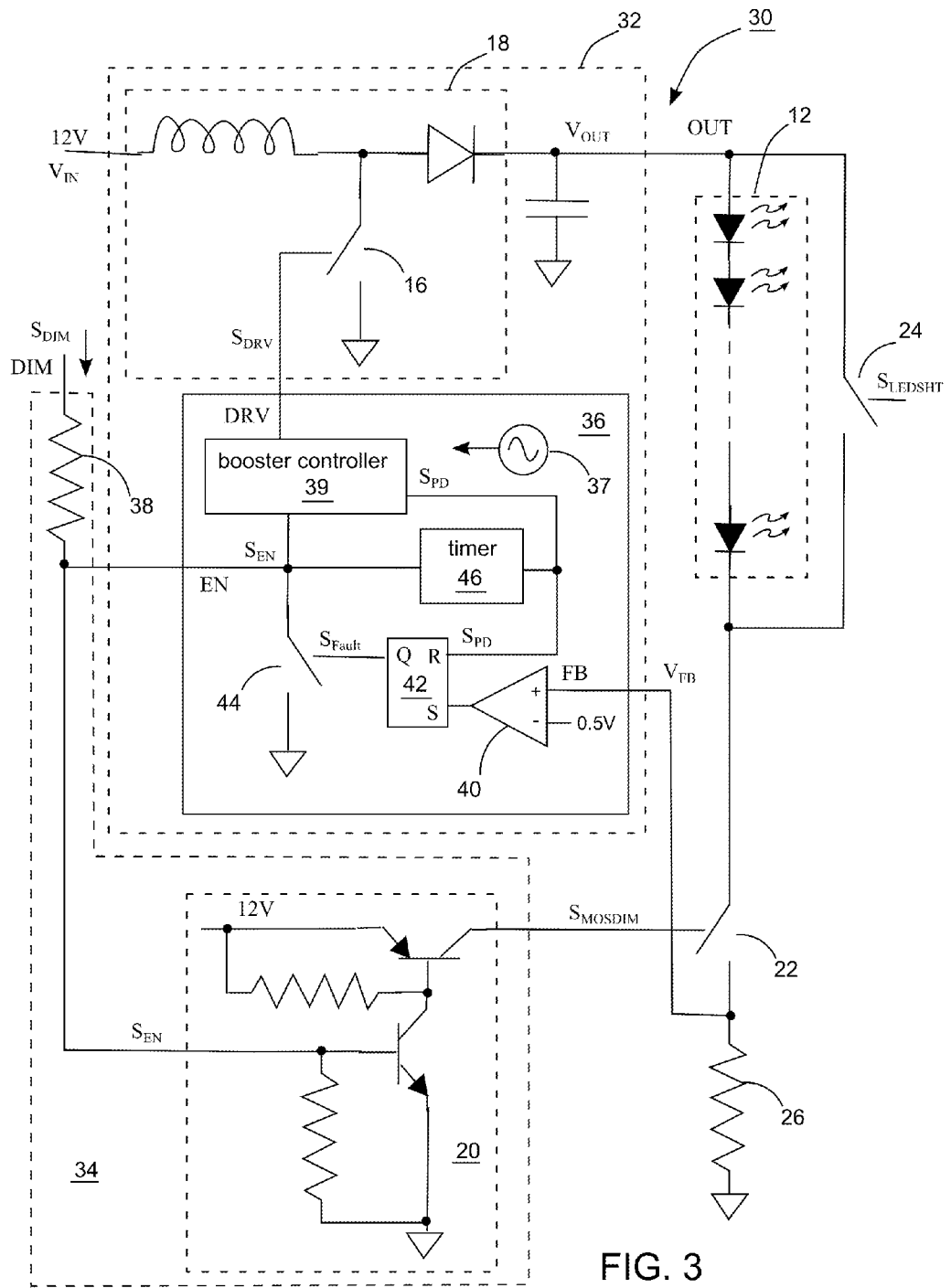
FIG. 3 shows an LED driver to drive a LED string according to embodiments of the invention.

FIG. 3 shows an LED driver 30 to drive the LED string 12 according to embodiments of the invention. Designed in the LED driver 30 has LED short protection, which prevents damages or risks caused by an LED short event from happening. The LED driver 30 has a switched mode power supply 32, a dimming controller 34 and a current switch 22.

The dimming controller 34 has a resister 38 and a level shifter 20. The resistor 38 is coupled between a dimming node DIM and an enable node EN of the power controller 36, and the level shifter 20 between the enable node EN and a control node of the current switch 22. In the occasions when the power controller 36 does not drive the enable node EN, the power controller 36 provides high input impedance to the enable node EN, and a dimming signal $S_{DIM}$ at the dimming node DIM alone controls the power controller 36 and the current switch 22. In other words, in these occasions, an asserted dimming signal $S_{DIM}$, "1" in logic, enables the power controller 36 to cause power conversion for powering the output power line OUT, and turns ON the current switch 22, while a deasserted dimming signal $S_{DIM}$ disable the power controller 36 to interrupt the power conversion and turns OFF the current switch 22.

Nevertheless, in some occasions the power controller 36 does drive the enable node EN, clamping the enable signal $S_{EN}$ to be either "1" or "0" in logic, based on different conditions. When the enable node EN is driven by the power controller 36, due to the existence of the resistor 38, the enable signal $S_{EN}$ has, for controlling the current switch 22, a higher priority than the dimming signal $S_{DIM}$. In other words, when the power controller 36 drives the enable node EN, the logic levels of the enable signal $S_{EN}$ and the dimming signal $S_{DIM}$ might differ, and the current switch 22 is under the control of the power controller 36. When the power controller 36 leaves the enable node to be high input impedance, the current switch 22 is under the control of the dimming signal $S_{DIM}$, and both the enable signal $S_{EN}$ and the dimming signal $S_{DIM}$ share the same logic value.

In one embodiment, when the enable signal $S_{EN}$ is asserted, "1" in logic, the power controller 36 generates pulse-width-modulation (PWM) signal $S_{DRV}$ at the driving node DRV, to periodically switch the power switch 16 for powering the output power line OUT and building up power source $V_{OUT}$, to regulate the feedback voltage $V_{FB}$. For example, the power controller 36 modulates the duty cycle of the PWM signal $S_{DRV}$ to stabilize the feedback voltage $V_{FB}$ at 0.3V, and to accordingly provide a substantially constant current for lighting the LED string 12. At the same time, the asserted enable signal $S_{EN}$, via the level-shifting provided by the level shifter 20, turns ON the current switch 22.

When the enable signal $S_{EN}$ is deasserted, "0" in logic, the power controller 36 makes pulse-width-modulation (PWM) signal $S_{DRV}$ "0" in logic, to constantly turn the power switch 16 OFF, stopping the power conversion. At the same time, the deasserted enable signal $S_{EN}$, via the level-shifting provided by the level shifter 20, becomes the signal $S_{MOS-DIM}$ to turn OFF the current switch 22.

Included in the power controller 36 are a booster controller 39, a comparator 40, a SR flip-flop 42, a clamping switch 44 and a timer 46, where the latter five apparatuses construct a LED protection circuit.

The comparator 40 detects the feedback voltage $V_{FB}$, which equally represents the current flowing through the resistor 26 and the LED string 12. During normal operation when no abnormal event happens and the LED string 12 is intended to illuminate, the feedback voltage $V_{FB}$ is about 0.3V, less than 0.5V, such that, in logic, the output of the comparator 40 is "0", the Q output of the SR flip-flop 42 "0", causing the clamping switch 44 an open circuit. As the clamping switch 44 does not clamp the enable node EN to the ground line, the enable signal $S_{EN}$ could have the same logic value with the dimming signal $S_{DIM}$.

As discussed previously, once an LED short event occurs to the LED string 12, the feedback voltage $V_{FB}$ rises from 0.3V, quickly. At the time when it exceeds 0.5V, the comparator 40 sets the SR flip-flop 42 and the fault signal $S_{Fault}$ output from the SR flip-flop 42 becomes "1" in logic, turning ON the clamping switch 44 and clamping the enable node EN to the ground line. The enable signal $S_{EN}$ becomes solidly "0", irrespective of which logic value the dimming signal $S_{DIM}$ is. As the enable signal $S_{EN}$ is "0", the booster controller 39 turns OFF the power switch 16, and the level shifter 20 OFF the current switch 22. Since the current switch 22 begins reducing the current flowing through the resistor 26, the feedback voltage $V_{FB}$ then drops, such that an over-high-voltage feedback voltage $V_{FB}$ is avoided and damage therefrom is prevented. Accordingly, an LED short protection is performed.

This LED short protection is not dismissed even when the feedback voltage $V_{FB}$ drops down to 0.5V due to the turning OFF of the current switch 22. It is because the fault signal $S_{Fault}$ could still be "1", as memorized by the SR flip-flop 42, to continuously clamp the enable signal $S_{EN}$ to "0" in logic.

The power controller 36 periodically dismisses the LED short protection, though, to stop clamping the enable signal $S_{EN}$. The timer 46 starts timing at the moment when the enable signal $S_{EN}$ turns to "0" in logic, or when the falling edge of the enable signal $S_{EN}$ occurs. Once the timer 46 finds that the disable time when the enable signal $S_{EN}$ continuously stays in "0" exceeds a preset valid period $T_{OUT}$, it turns the power-saving signal $S_{PD}$ of its output from "0" to "1", to reset the SR flip-flop 42, to make the fault signal $S_{Fault}$ "0" in logic, and to release the enable signal $S_{EN}$ from being clamped by the clamping switch 44. After then, the enable signal $S_{EN}$ starts to follow the dimming signal $S_{DIM}$, and the LED short protection is dismissed. In case that the dimming signal $S_{DIM}$ is "1" in logic and the LED short event has not been resolved, once the enable signal $S_{EN}$ is seemingly determined to be "1", the timer 46 resets, the power-saving signal $S_{PD}$ turns from "1" to "0", and the feedback voltage $V_{FB}$ starts rising up quickly due to the continuous existence of the LED short event. Once again the feedback voltage $V_{FB}$ will exceed 0.5V to trigger the LED short protection. Therefore, the power controller 36 periodically activates and dismisses the LED short protection. Only if the LED short event is resolved and the timer 46 has reset the SR flip-flop 42 to dismiss the LED short protection, then the power controller 36 could be controlled by the dimming signal $S_{DIM}$, operating in a normal condition.

Figure 4:
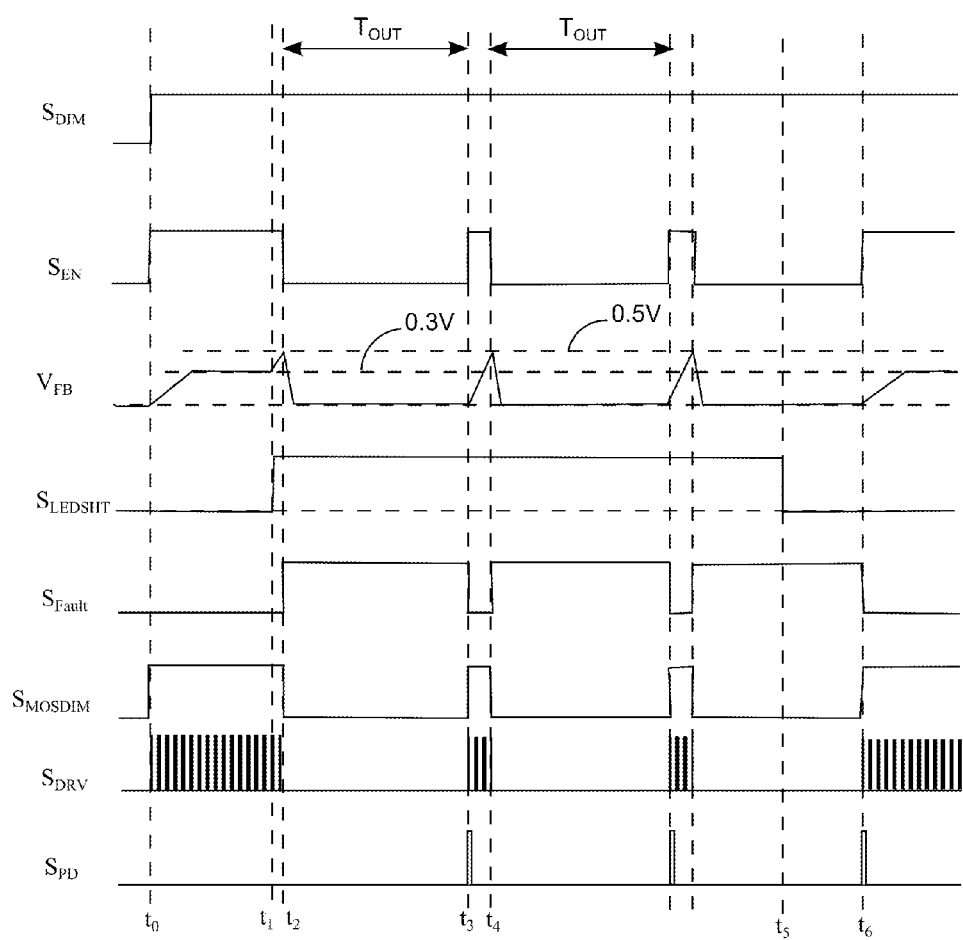
FIG. 4 illustrates time diagrams for signals in FIG. 3.

FIG. 4 illustrates time diagrams for signals in FIG. 3, including, from top to bottom, the dimming signal $S_{DIM}$, the enable signal $S_{EN}$, the feedback voltage $V_{FB}$, a signal $S_{LEDSHT}$ that controls switch 24 which could mimic the happening of an LED short event, the fault signal $S_{Fault}$, the switch signal $S_{MOSDIM}$ at the control node of the current switch 22, the PWM signal $S_{DRV}$ at the driving node DRV, and the power-saving signal $S_{PD}$.

Please refer to both FIG. 3 and FIG. 4. At time $t_0$ when the dimming signal $S_{DIM}$ turns from "0" to "1", the PWM signal $S_{DRV}$ periodically switches, with a cycle time, the power switch 16 ON or OFF, the switch signal $S_{MOSDIM}$ turns ON the current switch 22, and the feedback voltage $V_{FB}$ starts approaching to 0.3V.

At time $t_1$, the signal $S_{LEDSHT}$ turns from "0" to "1", to mimic the happening of the LED short event. As a result, the feedback voltage $V_{FB}$ rises abruptly from 0.3V.

At time $t_2$ when the feedback voltage $V_{FB}$ reaches 0.5V, the LED short protection is triggered. As analyzed previously, the SR flip-flop 42 turns the fault signal $S_{Fault}$ from "0" to "1", clamping the enable signal $S_{EN}$ at "0" in logic, such that both the PWM signal $S_{DRV}$ and the switch signal $S_{MOSDIM}$ both become "0" in logic. Meanwhile, as the falling edge of the enable signal $S_{EN}$ occurs, the timer 46 starts timing. Furthermore, as the current switch 22 becomes an open circuit, the feedback voltage $V_{FB}$ begins dropping.

At time $t_3$, the timer 46 acknowledges, byway of its timing, that the disable time period when the enable signal $S_{EN}$ is "0" has exceeded a preset valid period $T_{OUT}$. In other words, the LED short protection expires. Therefore, the timer 46 asserts the power-saving signal $S_{PD}$ to provide a timeout for the LED short protection. The Asserted power-saving sign $S_{PD}$ resets the fault signal $S_{Fault}$, releasing the clamping to the enable signal $S_{EN}$ and dismissing the LED short protection. It is therefore the enable signal $S_{EN}$ starts to follow the dimming signal $S_{DIM}$. Since the LED short event has not been resolved as the signal $S_{LEDSHT}$ is still "1", the feedback voltage $V_{FB}$ rises steeply.

At time $t_4$, the feedback voltage $V_{FB}$ reaches 0.5V, similar with what happened at time $t_2$. Therefore, the LED short protection is triggered once more. It can be concluded that if the LED short event is not resolved the power controller 36 will periodically activate and dismiss the LED short protection.

At time $t_5$ when the LED short event is resolved by means of turning the signal $S_{LEDSHT}$ to "0", the LED short protection is not immediately dismissed because the LED short protection has not expired. The timer 46 finds the expiration of the LED short protection at time $t_6$, such that the LED protection is dismissed and the power controller 36 recovers to the normal operations as it did prior to time $t_1$.

As shown in FIG. 3, the power controller 36 might have an oscillator 37 to decide the cycle time of the PWM signal $S_{DRV}$ and the preset valid period $T_{OUT}$. In one embodiment, the oscillator 37 decides that one cycle time is 33 microseconds, while the present valid period $T_{OUT}$ is 10000 cycle times.

When the enable signal $S_{EN}$ is "1", asserted, the booster controller 39 provides the PWM signal $S_{DRV}$ to periodically switch, with a cycle time defined by the oscillator 37, the power switch 16 ON and OFF, based on the feedback voltage $V_{FB}$, as illustrated in the period between times $t_0$ and $t_1$ of FIG. 4. When the enable signal $S_{EN}$ is "0", deasserted, the booster controller 39 keeps the PWM signal $S_{DRV}$ as being "0", turning OFF the power switch 16, as illustrated in the period between times $t_2$ and $t_3$. In one case that the enable signal $S_{EN}$ stays as being "0" for a very long time exceeding the preset valid time $T_{OUT}$, it probably means that the dimming signal $S_{DIM}$ is intended to be a constant "0" and to continuously darken the LED string 12. Any power consumed when the LED string 12 constantly darkens is a waste, though. In one embodiment, the asserted power-saving signal $S_{PD}$ sets the power controller 36 to operate in a power-saving mode, shutting down some circuits therein to reduce power consumption. For example, in the power-saving mode, the booster controller 39, the oscillator 37, or their combination are shut down to save power. Both the two time periods for deciding the entrance of the power saving mode and the expiration of the LED short protection respectively are the preset valid time $T_{OUT}$ in length. This invention is not limited to, however. In another embodiment, the former is longer than the latter.

Based on the previous teaching, the LED driver 30 of FIG. 3 according to embodiments of the invention can beneficially obtain the following achievements:

1. LED short protection: When the LED short event occurs the power controller 36 could timely switch off the power conversion, preventing the feedback voltage $V_{FB}$ from being over high to cause any damage.

2. Automatic recovery to normal operation after the LED short event vanishes: When the LED short protection expires the power controller 36 temporarily dismisses the LED short protection, and if the LED short event is not resolved this LED short protection resumes soon. A timeout of the LED short protection is thus provided. During the timeout, if the LED short event vanished, the power controller 36 automatically starts to operate normally, making the LED string 12 illuminate for example. Namely, the timeout of the LED short protection provides an opportunity for the power controller 36 to automatically recover to its normal operation if the LED short event is resolved.

3. Power saving: The dimming signal $S_{DIM}$, if having been deasserted for a long time enough, can render the power controller 36 to operate in a power-saving mode and reduce power consumption.

The prior art taught in FIG. 1 has an unrevealed problem: flickering. In view of the stabilization of the overall system and the reduction of switching loss, the bandwidth of the system response for the LED driver 10 cannot be very broad. Generally, the bandwidth of a system design locates at somewhere between 100 KHz to 300 KHz. This choice of the bandwidth also defines a minimum response delay time, which is how soon the system responds to a change of an input signal, such as the dimming signal $S_{DIM}$, and the broader the bandwidth the shorter the minimum response delay time. In case that the Dim-ON time, the pulse width when the dimming signal $S_{DIM}$ is "1", is shorter than the minimum response delay time, the LED driver 10 cannot response quick enough to stabilize the current passing the LED string 12. This unstable current could cause the LED string 12 to illuminate for a while and darken for another while, and the periodic switching between illuminating and darkening, if perceivable to humans' eyes, is called as flickering, which is commonly unwelcome or forbidden for a lighting system.

Figure 5:
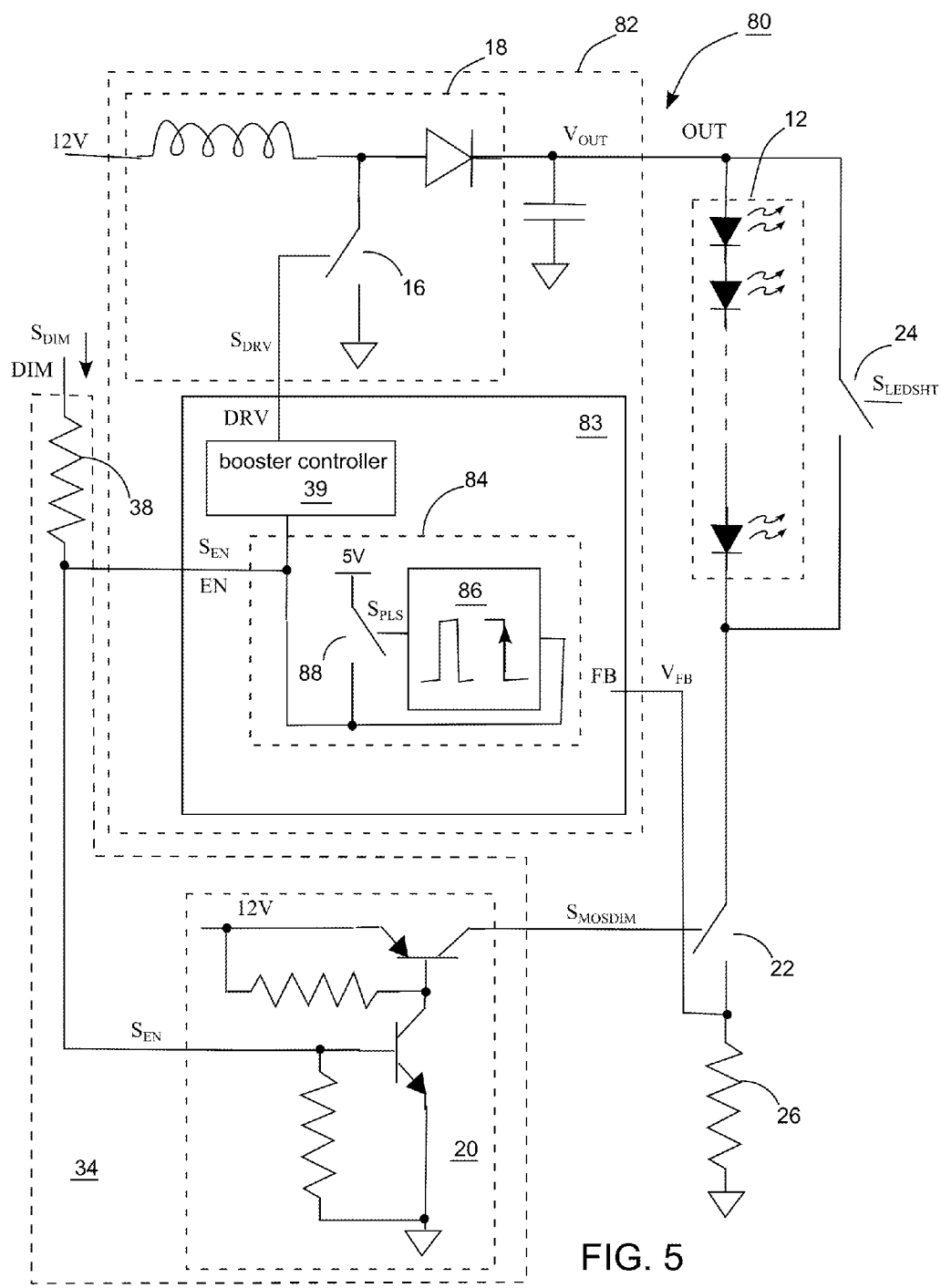
FIG. 5 demonstrates another LED driver according to embodiments of the invention.

FIG. 5 demonstrates another LED driver 80 according to embodiments of the invention, for driving the LED string 12, where the power controller 83 in the switched mode power supply 82 defines a minimum ON time to the LED string 12 to avoid the flickering. The minimum ON time is the minimum time that the LED string 12, if once driven to illuminate, must last to illuminate.

The power controller 83 includes a clamping circuit 84, which comprises a rising-edge-triggered pulse generator 86 and a clamping switch 88. When a rising edge of the enable signal $S_{EN}$ occurs, meaning that it turns from "0" to "1" in logic, the rising-edge-triggered pulse generator 86 generates a pulse $S_{PLS}$ with a pulse width of minimum duration $T_{MIN-ON}$. This pulse $S_{PLS}$ makes the enable signal $S_{EN}$ clamped to be 5V in voltage level, or "1" in logic, for the minimum duration $T_{MIN-ON}$ irrespective of the present logic value of the dimming signal $S_{DIM}$. The pulse $S_{PLS}$ vanishes after the minimum duration $T_{MIN-ON}$ and the clamping switch 88 stops clamping the enable signal $S_{EN}$, letting the enable signal $S_{EN}$ follow the dimming signal $S_{DIM}$. As indicated in the previous teaching, when the enable signal $S_{EN}$ is asserted, "1" in logic, the LED string 12 illuminates.

Figure 6A:
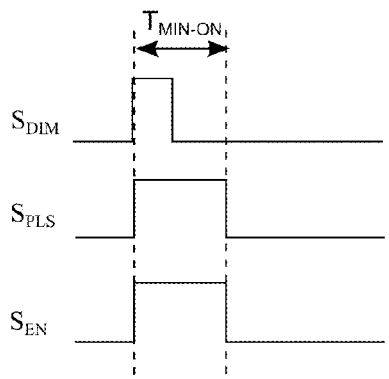
FIG. 6A and FIG. 6B shows two time diagrams.
Figure 6B:
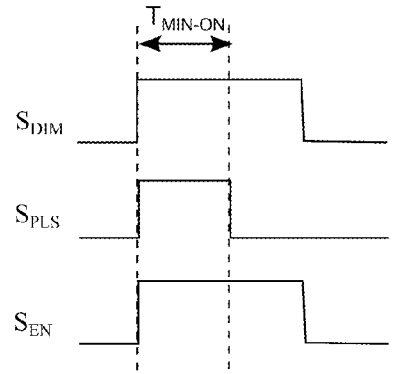

Two time diagrams are shown in FIG. 6A and FIG. 6B, respectively, and the signals in each figure, from top to bottom, are the dimming signal $S_{DIM}$, the pulse $S_{PLS}$, and the enable signal $S_{EN}$. In FIG. 6A, even though the Dim-ON time of the dimming signal $S_{DIM}$ is shorter than the minimum duration $T_{MIN-ON}$ the duration when the enable signal $S_{EN}$ is "1" is about the minimum duration $T_{MIN-ON}$ defined by the pulse $S_{PLS}$, because of the clamping provided by the clamping circuit 84. In FIG. 6B, the duration when the enable signal $S_{EN}$ is "1" is about the same with the Dim-ON time of the dimming signal $S_{DIM}$, which is longer than the minimum duration $T_{MIN-ON}$. It can be concluded from FIGS. 5, 6A and 6B that the illumination of the LED string 12, once starting, lasts at least the minimum duration $T_{MIN-ON}$ which accordingly defines the minimum ON time of the LED string 12. If the minimum duration $T_{MIN-ON}$ is chosen to be longer than the minimum response delay time of the LED driver 10, the flickering that occurs in the prior art could be avoided.

In one embodiment, the minimum duration $T_{MIN-ON}$ is two or three cycle times of the PWM signal $S_{DRV}$. In other words, the minimum duration $T_{MIN-ON}$ could be decided by the oscillator 37.

Figure 7:
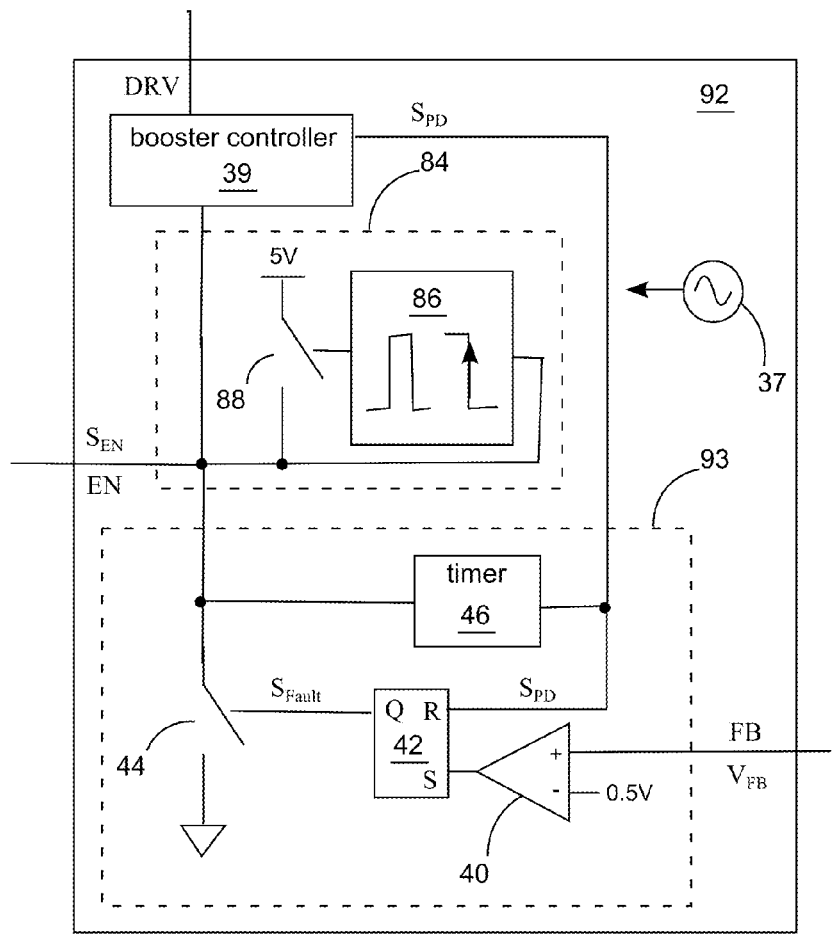
FIG. 7 demonstrates a power controller according to embodiments of the invention.

The LED short protection of FIG. 3 and the minimum duration $T_{MIN-ON}$ of FIG. 5 could together be implemented in a power controller, as exemplified in FIG. 7. In an embodiment, the power controller 92 of FIG. 7 replaces the power controller 36 in FIG. 3. Inside the power controller 92 are the clamping circuit 84 and LED short protection circuit 93, both of which are explained and detailed in previous paragraphs with references to FIG. 3 and FIG. 5, such that their explanations are omitted for brevity. In FIG. 7, the oscillator 37 defines one cycle time of the PWM signal $S_{DRV}$, which could associate with the preset valid period $T_{OUT}$ and the minimum duration $T_{MIN-ON}$.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A driver for driving a LED string consisting of LEDs, the driver comprising:
    a current switch connected in series with the LED string between a power line and a ground line; and
    a switched mode power supply, for powering the power line to regulate a signal representing a current passing through the LED string, wherein the switched mode power supply comprises an enable node and a clamping circuit;
    wherein an enable signal at the enable node is capable of switching the current switch; and
    when a predetermined event occurs the clamping circuit clamps the enable signal to have a predetermined logic value, the current switch thereby being kept either open or short.

2. The driver as claimed in claim 1, wherein the switched mode power supply comprises a power switch, and is configured to provide a PWM signal to control the power switch.

3. The driver as claimed in claim 2, wherein the enable signal, if asserted, is capable of activating the switched mode power supply to provide the PWM signal, and, if deasserted, is capable of stopping the switched mode power supply from providing the PWM signal.

4. The driver as claimed in claim 3, wherein the clamping circuit clamps the enable signal to be asserted and to make the current switch short for a period of time when a rising edge of the enable signal occurs.

5. The driver as claimed in claim 1, further comprising a level shifter coupled between the current switch and the enable node, for level shifting the enable signal to control the current switch.

6. The driver as claimed in claim 1, wherein if a disable time period when the enable signal stays as being deasserted exceeds a predetermined period of time, the switched mode power supply begins operating in a power-saving mode.

7. A driving method for a LED string consisting of LEDs, comprising:
    coupling the LED string and a current switch in series between a power line and a ground line;
    providing a switched mode power supply to power the power line and to regulate a signal representing a current passing through the LED string;
    providing an enable signal capable of switching the current switch and activating the switched mode power supply;
    detecting whether a predetermined event occurs; and
    clamping, when the predetermined event occurs, the enable signal to have a predetermined logic value, the current switch thereby being kept either open or short.

8. The driving method as claimed in claim 7, wherein the predetermined event is the occurrence of a rising edge of the enable signal, and the driving method further comprises clamping, when the predetermined event occurs, the enable signal to be asserted and to make the current switch short.

9. The driving method as claimed in claim 8, comprising:
    clamping, during a minimum duration after the happening of the predetermined event, the enable signal to be asserted, the LED string thereby having a minimum ON time; and
    stopping clamping the enable signal after the expiration of the minimum duration.

10. The driving method as claimed in claim 9, wherein the switched mode power supply operates with a cycle time to power the power line, and the minimum duration is a plurality of cycle times.

11. A driver for driving a LED string consisting of LEDs, the driver comprising:
    a current switch connected in series with the LED string between a power line and a ground line; and
    a switched mode power supply, for being activated to power the power line and to regulate a signal representing a current passing through the LED string, comprising:
        an enable node, wherein an enable signal at the enable node is capable of activating the switched mode power supply and turning ON the current switch at the same time, and deactivating the switched mode power supply and turning OFF the current switch at the same time;
        a clamping circuit for clamping the enable signal to have a predetermined logic value for a period of time; and
        a timer, for timing and stopping the clamp circuit from clamping the enable signal when the period of time expires.

12. The driver as claimed in claim 11, comprising:
    a level shift coupled between the current switch and the enable node, for level shifting the enable signal to control the current switch.

13. The driver as claimed in claim 11, wherein the switched mode power supply comprises a power switch, a PWM signal is provided to the power switch when the enable signal activates the switched mode power supply, and the power switch is constantly turned OFF when the enable signal deactivates the switched mode power supply.

14. The driver as claimed in claim 13, wherein the period of time starts when the enable signal has a rising edge.

15. The driver as claimed in claim 13, wherein the period of time starts when the enable signal has a falling edge.

\* \* \* \* \*